(12) United States Patent
Mazuz et al.

(10) Patent No.: US 8,331,393 B1
(45) Date of Patent: *Dec. 11, 2012

(54) METHOD AND APPARATUS OF DE-MULTIPLEXING DATA

(75) Inventors: Gadi Mazuz, Shoham (IL); Alex Margulis, Ashdod, IL (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,705

(22) Filed: Mar. 9, 2009

Related U.S. Application Data

(63) Continuation of application No. 10/261,677, filed on Oct. 2, 2002, now Pat. No. 7,505,478.

(51) Int. Cl.
*H04L 12/54* (2006.01)

(52) U.S. Cl. .......... 370/429; 370/535; 370/537

(58) Field of Classification Search .......... 370/351, 370/389, 428, 429, 532, 533, 535, 536, 537, 370/539, 540, 541, 542, 543, 544, 545

See application file for complete search history.

(56) References Cited

U.S. PATENT DOCUMENTS

| | | | |
|---|---|---|---|
| 6,356,528 B1 | 3/2002 | Lundby et al. | |
| 6,624,767 B1 * | 9/2003 | Shiu et al. | 341/81 |
| 6,828,926 B2 | 12/2004 | Jaffe et al. | |
| 6,944,729 B2 | 9/2005 | Woodard | |
| 6,985,093 B2 | 1/2006 | Jaffe et al. | |
| 6,988,234 B2 | 1/2006 | Han | |
| 7,072,410 B1 | 7/2006 | Monsen | |
| 7,187,708 B1 | 3/2007 | Shiu et al. | |
| 7,203,527 B2 | 4/2007 | Czaja et al. | |
| 7,227,851 B1 | 6/2007 | Gopalakrishnan et al. | |
| 7,310,324 B2 | 12/2007 | T | |
| 7,385,949 B1 | 6/2008 | Botha | |
| 7,386,001 B1 | 6/2008 | Kim et al. | |
| 7,505,535 B2 * | 3/2009 | Ha et al. | 375/340 |
| 7,545,731 B2 * | 6/2009 | Agin et al. | 370/204 |
| 7,577,182 B2 * | 8/2009 | Umeno | 375/137 |
| 7,613,985 B2 * | 11/2009 | Pons et al. | 714/774 |
| 7,640,482 B2 * | 12/2009 | Paumier et al. | 714/767 |
| 7,916,754 B2 * | 3/2011 | Valadon | 370/476 |

* cited by examiner

*Primary Examiner* — Hassan Phillips
*Assistant Examiner* — Mark A Mais

(57) ABSTRACT

Embodiments of the present invention provide a method comprising determining, by a processor, at least an indication of a size of a de-interleaved symbol from a frame within a frame buffer, estimating, by the processor, a target transport channel buffer in a channel buffer for the de-interleaved symbol, and writing, by the processor, the de-interleaved symbol in the channel buffer based on the estimated target transport channel buffer.

11 Claims, 3 Drawing Sheets

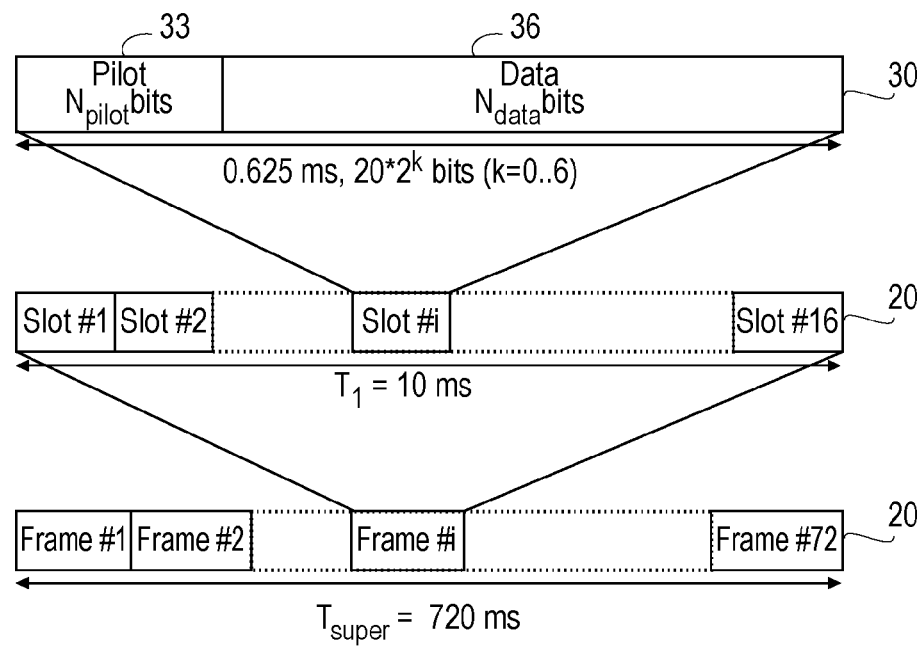
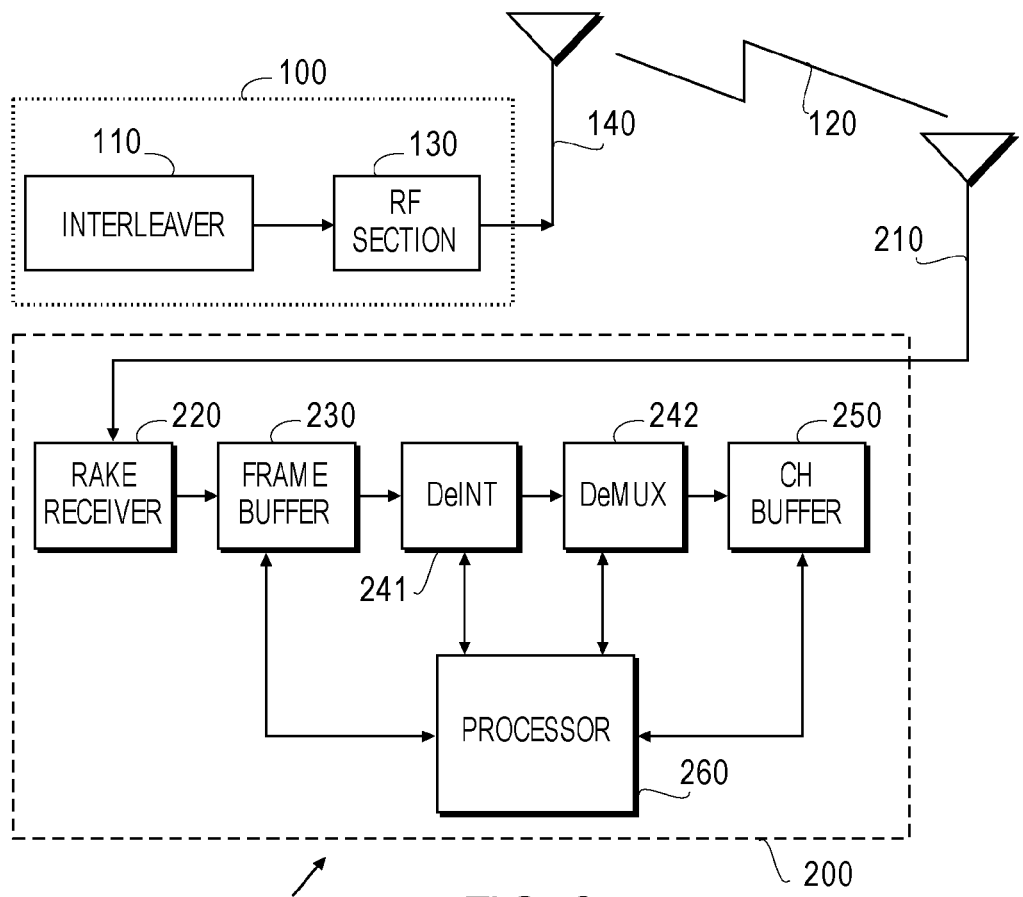

METHOD AND APPARATUS OF DE-MULTIPLEXING DATA

CROSS-REFERENCES TO RELATED APPLICATIONS

This present application is a continuation of U.S. patent application Ser. No. 10/261,677 filed Oct. 2, 2002 entitled, "METHOD AND APPARATUS OF DE-MULTIPLEXING DATA," now U.S. Pat. No. 7,505,478, issued Mar. 17, 2009. The specification of said application is hereby incorporated in its entirety for all purposes, except for those sections, if any, that are inconsistent with this specification.

BACKGROUND OF THE INVENTION

In modem wireless communication systems such as cellular communication systems, radio transmitters may transmit interleaved and multiplexed data over transport channels. The interleaved and multiplexed data may be received by radio receivers. The radio receiver may process the received data. An example of a data processing method may be as follows: storing the received multiplexed data at a first temporary memory location, de-interleaving the stored data, storing the de-interleaved data at a second temporary memory location, de-multiplexing the stored data and writing the de-multiplexed data in the radio receiver memory. As is shown in the above example, the radio receiver may need to use at least two temporary memory locations to process the data. Thus, a large memory allocation in order to provide the memory space needed to perform the above described method. Furthermore, the receiver may consume a high current due to data transactions between temporary memories.

Thus, there is a continuing need for better ways to mitigate the above-described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 1 is an illustration of an example of a frame structure;

FIG. 2 is a block diagram of a receiver according to an embodiment of the present invention;

Figure 3:
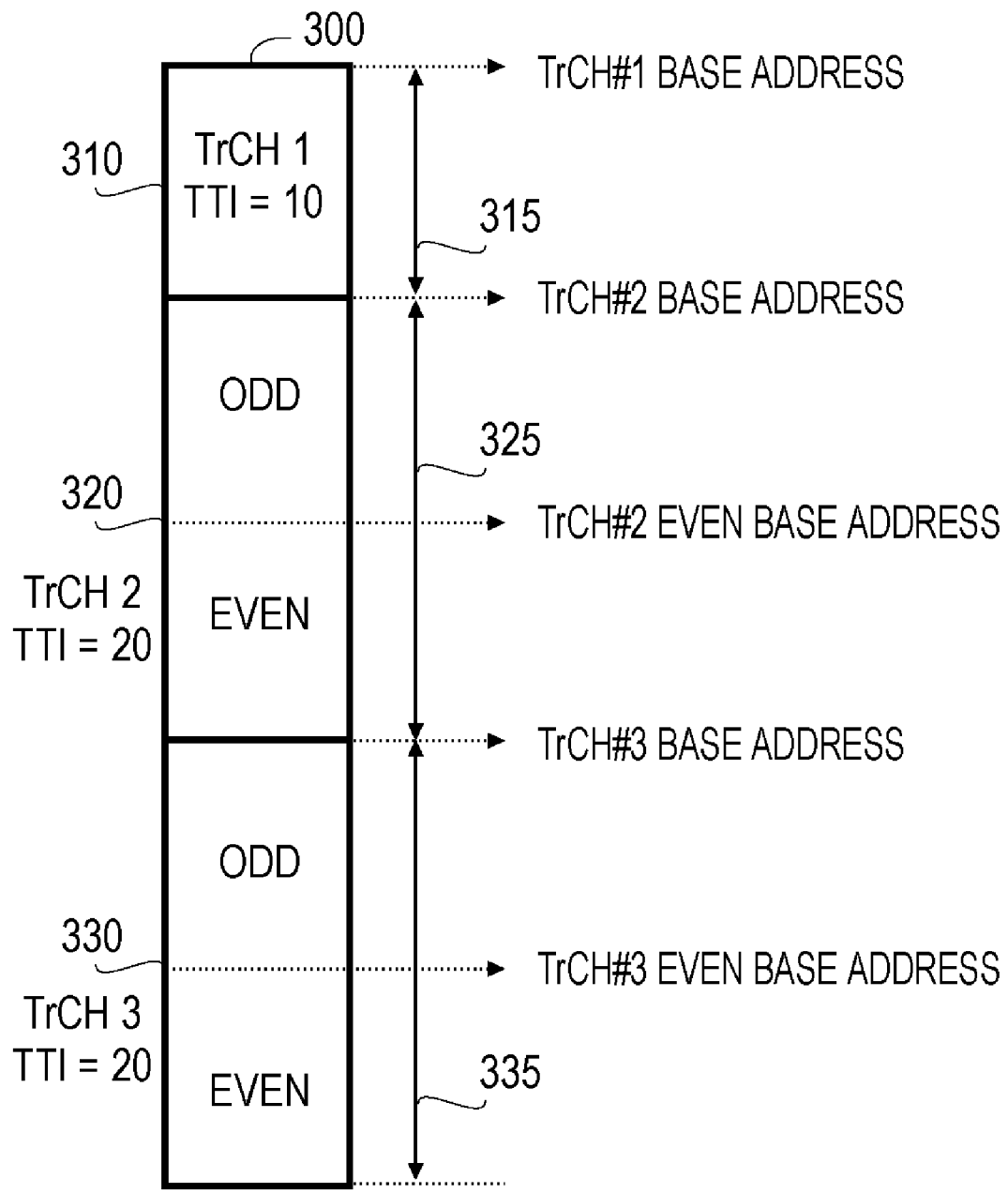
FIG. 3 is a block diagram of a channel buffer according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in variety of applications. Although the present invention is not limited in this respect, the circuits and techniques disclosed herein may be used in many apparatuses such as receivers of a radio system. Receivers intended to be included within the scope of the present invention include, by a way of example only, cellular radiotelephone receivers, two-way radio receivers, digital system receivers, wireless local area network receivers, wideband receivers, ultra wideband receivers, and a like, Type of cellular radiotelephone receivers intended to be within the scope of the present invention include, although not limited to, Code Division Multiple Access (CDMA) and wide band CDMA (W-CDMA) cellular radiotelephone receivers for receiving spread spectrum signals, CDMA-2000 receivers, and the like.

Although the scope of the present invention is not limited in this respect, a cellular communication system, for example WCDMA cellular communication system, may include transport channels that may transport data from a base station to a mobile station. For example, FIG. 1 shows content of data that may be transmitted over the transport channel, although the scope of the present invention is not limited in this respect.

In this example, data stream 10 may include 72 frames. A frame 20 may be 10 milliseconds (ms) long and may include 16 slots. A slot 30 may include data 36 of a pilot channel 33. Although it should be understood by one skilled in the art, data stream 10 may be represented in symbols. It should be understood by one skilled in the art that symbols may be a product of modulating the symbol duration of data 10 with a pseudo-random binary sequence. The symbol duration may be dependent on the spreading factor. Furthermore, the 'symbol may represent specific information and may include one or more bits, if desired.

Although the scope of the present invention is not limited in this respect, the frames may be interleaved before they are transmitted. Interleaving of data may be done by rearranging the content of the frames. In addition, the slots may be interleaved in substantially the same manner as the frames were interleaved.

Turning to FIG. 2, an example of a wireless communication system 1000 in accordance with an embodiment of the present invention is shown. Although the scope of the present invention is not limited in this-respect, wireless communication system 1000 may be a CDMA or WCDMA cellular communication system, and the like. Furthermore, wireless communication system 1000 may include a transmitter 100 and a receiver 200. For example, transmitter 100 may be a transmitter of a base station and receiver 200 may be a receiver a mobile station.

In at least one embodiment of the present invention, although the scope of the present invention is not limited in this respect, transmitter 100 may include an interleaver 110 that may interleave data before it is transmitted over at least one transport channel 120, if desired. Furthermore, transmitter 100 may include a radio frequency (RF) section 130 and may be coupled to an antenna 140 to transmit the interleaved data over the transport channel 120, if desired.

Although the scope of the present invention is not limited to this particular embodiment, the receiver 200 may be a WCDMA receiver, and the like. The receiver 200 may be coupled to an antenna 210 a rake receiver 220, a frame buffer 230, a deinterleaver 241, a de-multiplexer 242, a channel buffer 250 and a processor 260. However, in alternative embodiments of the present invention, de-interleaver 241 and de-multiplexer 242 may be combined.

Although the scope of the present invention is not limited in this respect, receiver 200 may receive data from transmitter 100 over at least one of the transport channels, for example transport channel 120. The received data may include interleaved data. Receiver 200 may receive data through antenna 210. Although the scope of the present invention is not limited in this respect, types of antenna that may be used may include a dipole antenna, a one-pole antenna, a shot antenna, and the like.

In addition, rake receiver 220 may receive the data and may provide interleaved frames that may be stored in frame buffer 230. Although the scope of the present invention is not limited in this respect, in some embodiments of the present invention rake receiver 230 may be include one or more rake receivers. For example, rake receiver 230 may be CDMA rake receiver or a WCDMA rake receiver and may be implemented by hardware and/or software, if desired. Furthermore, in some embodiments of the present invention, frame buffer 230 may store at least one frame provided by the rake receiver, if desired.

In addition, in some embodiments of the present invention, addresses of frame buffer 230, addresses of channel buffer 250 and addresses of other receiver 200 buffers may be allocated in the memory of receiver 200. In addition, types of memories that may be used by receiver 200, for example, may be a read access memory (RAM), dynamic RANI (DRAM), static RAM (SRAM) and the like.

Although the scope of the present invention is not limited in this respect, frame buffer 230 may provide a frame to de-interleaver 241. De-interleaver 241 may de-interleave the soft symbols and de-multiplexer 242 may de-multiplex the de-interleaved soft symbols. Furthermore, de-interleaving and de-multiplexing may be done according to methods known to the one skilled in the art and may include interleave/de-interleave methods, multiplex/de-multiplex methods that may be used in CDMA, WCDMA, CDMA 2000, UTMS and the like, cellular radio communication system.

Although the scope of the present invention is not limited in this respect, writing a de-multiplexed symbol to channel buffer 250 may be done without storing a de-multiplexed frame in an additional buffer. In addition, it should be understood to one skilled in the art that de-interleaving, de-multiplexing and writing to channel buffer 250 may be consecutive operations.

Although the scope of the present invention is not limited in this respect, processor 260 may receive the de-interleaved symbol from de-interleaver 241 and may decode a de-interleaved address of the de-interleaved symbol. Although the scope of the present invention is not limited in this respect, the de-interleaved address may be the address of the symbol in frame buffer 230. In addition, processor 260 may calculate a target address of the de-multiplexed symbol in channel buffer 250 and may write the de-multiplexed symbol in channel buffer 250. A method of calculating and writing the de-multiplexed symbol in channel buffer 250 will be described in detail with reference to FIG. 4.

In addition, processor 260 may be used to control frame buffer 230, deinterleaver 241, de-multiplexer 242 and channel buffer 250. Furthermore, processor 260 may be, for example, a digital signal processor (DSP), a special purpose processor, and the like, although the scope of the present invention is in no way limited in this respect.

In addition, although the scope of the present invention is not limited in this respect, channel buffer 250 may be divided into two or more logical buffers, for example transport channel buffers, to store the de-multiplexed symbols of transport channels such as for example transport channel 120. Furthermore, the number of the logical buffers that may be included in the channel buffer may be substantially equal to the number of transport channels. Furthermore, in other embodiments of the present invention, the length of channel buffer 250 may be dynamically allocated according to the length of data of the transport channels. In some embodiments of the present invention, the allocation of transport channels buffers in channel buffer 250 may be done by processor 260, if desired. Furthermore, in some embodiments of the invention, channel buffer 250 may physically be one buffer with a common read write port.

Turning to FIG. 3, a block diagram of a channel buffer 300 according to some embodiments of the present invention is shown. Although the scope of the present invention is not limited in this respect, channel buffer 300 may include a plurality of transport channel buffers, for example, transport channel buffer 1 (TrCH#1) 310, transport channel buffer 2 (TrCH#2) 320 and transport channel buffer 3 (TrCH#3) 330. The size of a transport channel buffer may provide an indication of the address range of the transport channel buffer and may show the number of addresses. For example, the size of TrCH#1 (marked as 315) may be 50, the size of TrCH#2 (325) may be 70 and the size of TrCH#3 (335) may be 70.

Furthermore, in this example, the time transmit interval (TTI) of TrCH#1 310, may be 10 ins, TTI of TrCH#2 320 may be 20 ins and TTI of TrCH#3 320 may be 20 ms. However, in other embodiments of the present invention the TTI may be 10 ms, 20 ins, 40 ms, 80 ins, and the like. In this example, a frame length may be 10 ms, thus, according to the TTI, TrCH#1 310 may include one frame and TrCH#2 320 and TrCH#3 330 may include two frames. The first frames of TrCH#2 320 and TrCH#3 330 may be marked as odd frames, and the second frames of TrCH#2 320 and TrCH#3 330 may be marked as even frames.

Although the scope of the present invention is not limited in this respect, a base address of a frame may be calculated according to the transport buffer size. In this example, a base address of TrCH#1 may be 0, a base address of TrCH#2's odd frame may be 50, a base address of TrCH#2's even frame may be 80, a base address of TrCH#3's odd frame may be 120, and a base address of TrCH#2's even frame may be 150. Furthermore, processor 260 may dynamically allocate the desired address range for channel buffer in the memory of receiver 200. Although the scope of the present invention is not limited in this respect, de-multiplexer 242 may de-multiplex symbols, for example, soft symbols, and may write the de-multiplexed soft symbols in a target address of channel buffer 250. Furthermore, processor 260 may calculate the target address of the de-multiplexed symbol, although the scope of the present invention is not limited in this respect.

Figure 4:
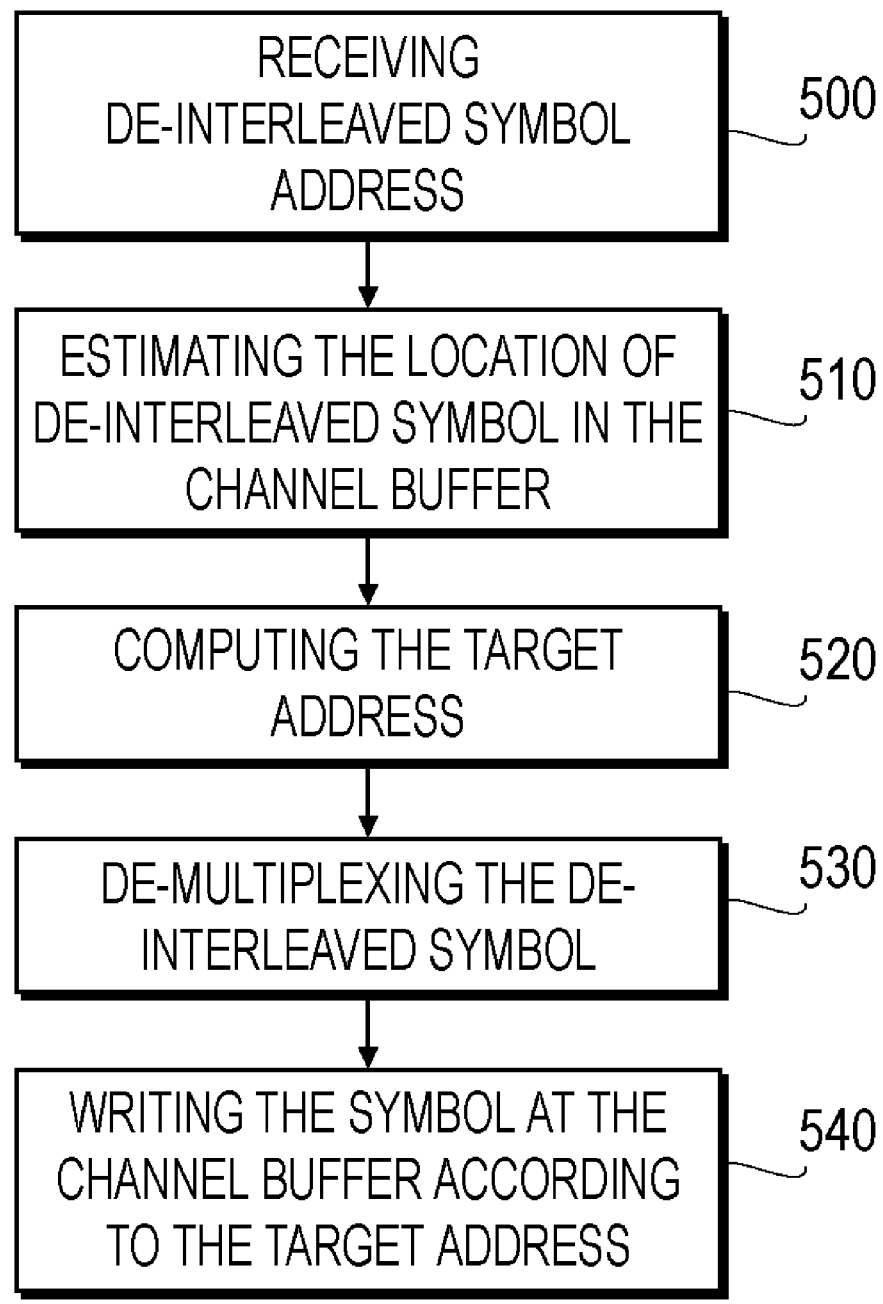
FIG. 4 is flow chart of a method according to some embodiments of the present invention.

Turning to FIG. 4, a method of writing de-multiplexed symbols of a de-interleaved frame according to some embodiments of the present invention will be described now. Although, the present invention is not limited in this respect, the method may start with receiving the symbol address from de-interleaver 241, for example the address may be 30 (block 500). The method may continue by estimating to which one of the transport channel buffers of channel buffer 300 the symbol may be written (block 510). For example, processor 260 may estimate whether or not the symbol may be written at TrCH#1 by performing the following test:

De-interleaved symbol address−TrCH#1 size<1

Furthermore, to estimate whether or not the symbol may be written at TrCH#2 the following test may be done:

De-interleaved symbol address−TrCH#1 size−TrCH#2<1.

In addition, to estimate whether or not the symbol may be written at TrCH (#3 the following test may be done:

De-interleaved symbol address−TrCH#1 size−TrCH#2 size−TrCH#3 size<1.

Although the scope of the present invention is not limited in this respect, after determining to which transport channel buffer the symbol may be written, the target address of the symbol in transport channel buffer may be computed (block 520). For example, the target address for TrCH#1 may be computed according to the following equation:

Target Address−TrCH#1 base address+de-interleaved address.

Furthermore, the following equations may be used to compute the target address of the symbol in TrCH#2's odd frame, in TrCH#2's even frame, in TrCH#3's odd frame and in TrCH#2's even frame, if desired. For example, for TrCH#2's odd frame the target address may be:

Target Address=TrCH#2 base address+(de-interleaved address−TrCH#1 size);

for TrCH#2's even frame the target address may be:

Target Address=TrCH#2 even base address+(de-interleaved address−TrCH#1 size);

For example, for TrCH#3's odd frame the target address may be:

Target Address=TrCH#3 base address+(de-interleaved address−TrCH#1 size−TrCH#2 size);

for TrCH#3's even frame the target address may be:

Target Address=TrCH#3 even base address+(de-interleaved address−TrCH#1size−TrCH#2 size);

However it should be understood by one skilled in the art that embodiments of the present invention are in no way limited to the above equations.

Although the scope of the present invention is not limited in this respect, the de-interleaved symbol may be de-multiplexed (block 530) and written to the appropriate transport channel buffer according to the above computed target address (block 540).

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   determining, by a processor, one of size or an indication of size of a de-interleaved symbol from a frame within a frame buffer;
   estimating, by the processor, a target transport channel buffer in which a de-multiplexed symbol should be written, the target transport channel buffer being one of a plurality of transport channel buffers of a channel buffer, wherein the estimating comprises:
      inputting a size of at least one of the transport channel buffers;
      determining a difference between (i) the one of size or an indication of size of a de-interleaved symbol and (ii) the size of the at least one of the transport channel buffers; and
      comparing the difference with a threshold in order to estimate if the de-multiplexed symbol may be written at the at least one of the transport channel buffers;
   de-multiplexing, by a de-multiplexer, the de-interleaved symbol from the received frame into a de-multiplexed symbol
   writing, by the processor, the de-multiplexed symbol to the target transport channel buffer.

2. The method of claim 1, further comprising adding, by the processor, an address of the de-multiplexed symbol to a base address of the at least one of the transport channel buffers.

3. An apparatus comprising:
   a frame buffer configured to receive a frame over a channel, wherein the frame includes a de-interleaved symbol;
   a de-multiplexer configured to de-multiplex, from the received frame, the de-interleaved symbol into a de-multiplexed symbol;
   a channel buffer configured to store the de-multiplexed symbol, wherein the channel buffer comprises a plurality of transport channel buffers; and
   a processor configured to:
      estimate a target transport channel buffer in which the de-multiplexed symbol should be written, wherein the processor is configured to estimate the target transport channel buffer by:
         inputting a size of at least one of the transport channel buffers;
         determining a difference between (i) the one of size or an indication of size of a de-interleaved symbol and (ii) the size of the at least one of the transport channel buffers; and
         comparing the difference with a threshold in order to estimate if the de-multiplexed symbol may be written at the at least one of the transport channel buffers; and
      write the de-multiplexed symbol to the target transport channel buffer.

4. The apparatus of claim 3, further comprising a de-interleaver configured to de-interleave the frame from the frame buffer.

5. The apparatus of claim 3, wherein the processor is further configured to add an address of the de-multiplexed symbol to a base address of the at least one transport channel buffer.

6. The apparatus of claim 3, wherein the processor is a digital signal processor.

7. An apparatus comprising:
a dipole antenna configured to receive a signal comprising at least one frame over a transport channel;
a frame buffer configured to receive and store the at least one frame from the signal;
a de-interleaver configured to de-interleave an interleaved symbol within the frame and to provide a de-interleaved symbol;
a de-multiplexer configured to de-multiplex the de-interleaved symbol from the frame and to provide a de-multiplexed symbol;
a channel buffer configured to store the de-multiplexed symbol, wherein the channel buffer comprises a plurality of transport channel buffers; and
a processor configured to:
  estimate a target transport channel buffer in which the de-multiplexed symbol should be written, wherein the processor is configured to estimate the target transport channel buffer by:
    inputting a size of at least one of the transport channel buffers;
    determining a difference between (i) the one of size or an indication of size of a de-interleaved symbol and (ii) the size of the at least one of the transport channel buffers; and
    comparing the difference with a threshold in order to estimate if the de-multiplexed symbol may be written at the at least one of the transport channel buffers; and
  write the de-interleaved symbol to the target transport channel buffer.

8. The apparatus of claim 7, wherein the processor is further configured to add an address of the de-multiplexed symbol to a base address of the at least one transport channel buffer.

9. The apparatus of claim 7, wherein the processor is a digital signal processor.

10. An article comprising a computer readable non-transitory storage medium having stored thereon instructions that when executed:
cause a de-multiplexer in the article to de-multiplex a de-interleaved symbol from a frame within a frame buffer and to provide a de-multiplexed symbol; and
cause a processor in the article to:
  determine one of size or an indication of size of the de-interleaved symbol;
  estimate a target transport channel buffer in which the de-multiplexed symbol should be written, the target transport channel buffer being one of a plurality of transport channel buffers of a channel buffer, wherein the instructions cause the processor to estimate a target transport channel buffer by:
    inputting a size of at least one of the transport channel buffers;
    determining a difference between (i) the one of size or an indication of size of the de-interleaved symbol and (ii) the size of the at least one of the transport channel buffers; and
    comparing the difference with a threshold in order to estimate if the de-multiplexed symbol may be written at the at least one of the transport channel buffers; and
  write the de-multiplexed symbol to the target transport channel buffer.

11. The article of claim 10, wherein the computer readable storage medium has stored thereon further instructions that when executed cause the processor in the article to add an address of the de-multiplexed symbol to a base address of the at least one transport channel buffer.

* * * * *